US010590677B2

United States Patent
Papanikolaou et al.

(10) Patent No.: US 10,590,677 B2
(45) Date of Patent: Mar. 17, 2020

(54) HEATED MECHANISM FOR DEPLOYABLE EXTERIOR DOOR HANDLE FOR A VEHICLE

(71) Applicant: Ford Global Technologies, LLC, Dearborn, MI (US)

(72) Inventors: Kosta Papanikolaou, Huntington Woods, MI (US); David Manuel Rogers, Southfield, MI (US); Rajesh K. Patel, Farmington Hills, MI (US); Livianu Dorin Puscas, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 665 days.

(21) Appl. No.: 15/195,078

(22) Filed: Jun. 28, 2016

(65) Prior Publication Data
US 2017/0370123 A1 Dec. 28, 2017

(51) Int. Cl.
*E05B 17/00* (2006.01)
*B60J 5/04* (2006.01)
(Continued)

(52) U.S. Cl.
CPC ............ *E05B 17/0016* (2013.01); *B60J 5/04* (2013.01); *E05B 85/103* (2013.01);
(Continued)

(58) Field of Classification Search
CPC ...... E05B 17/00; E05B 17/1016; E05B 17/10; E05B 17/0029; E05B 17/0033;
(Continued)

(56) References Cited

U.S. PATENT DOCUMENTS

| 5,573,685 A | 11/1996 | Boncaldo |
| 6,550,103 B2 * | 4/2003 | Koops ................ E05B 17/0016 16/110.1 |

(Continued)

FOREIGN PATENT DOCUMENTS

| CN | 204355223 | * | 5/2015 |
| DE | 102014000819 | | 8/2014 |
| KR | 0159869 | | 8/1998 |

OTHER PUBLICATIONS

Gentherm, "Energy Efficient Climate Zone Heating & Cooling," web page http://www.gentherm.com/en/page/interior-heating, Apr. 6, 2016.

*Primary Examiner* — Shawntina T Fuqua
(74) *Attorney, Agent, or Firm* — David Coppiellie; Price Heneveld LLP

(57) ABSTRACT

A vehicle includes a door-operating mechanism for selectively releasing a vehicle door from a closed position. A door handle is in communication with the door operating mechanism. The door handle is operable between a flush position, wherein an outer face of the door handle is flush with a portion of an exterior surface of the vehicle door such that only the outer face of the door handle is accessible, and an extended position, wherein the outer face of the door handle is moved away from the exterior surface of the vehicle door such that a rear surface of the door handle is accessible. A heating mechanism is in thermal communication with the outer face of the door handle and the exterior surface of the vehicle door. A remote transmitter is in communication with the heating mechanism, wherein the remote transmitter selectively activates the heating mechanism.

9 Claims, 9 Drawing Sheets

(51) Int. Cl.
*E05B 85/10* (2014.01)
*H05B 6/10* (2006.01)

(52) U.S. Cl.
CPC .............. *E05B 85/107* (2013.01); *H05B 6/10* (2013.01); *E05Y 2900/531* (2013.01)

(58) Field of Classification Search
CPC ...... E05B 85/10; E05B 85/103; E05B 85/107; E05B 79/06; E05B 81/34; E05B 81/06; E05B 81/78; E05B 81/90; H05B 6/10; H05B 1/0239; B60J 5/04; B60J 5/0434; Y10T 292/57; Y10T 292/699; Y10T 292/85; Y10T 16/458; Y10T 16/464; Y10T 16/50; Y10T 16/476

See application file for complete search history.

(56) References Cited

U.S. PATENT DOCUMENTS 8,701,353 B2 * 4/2014 Patel ..................... E05B 85/107
49/503
9,108,591 B2 8/2015 Ieda et al.

* cited by examiner

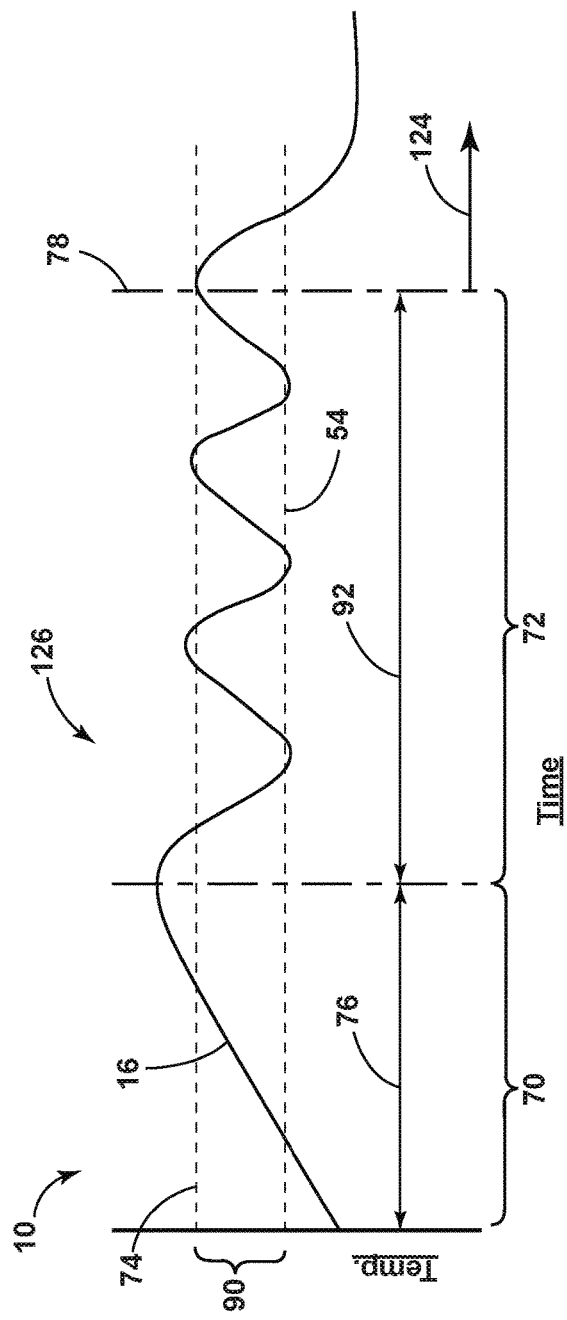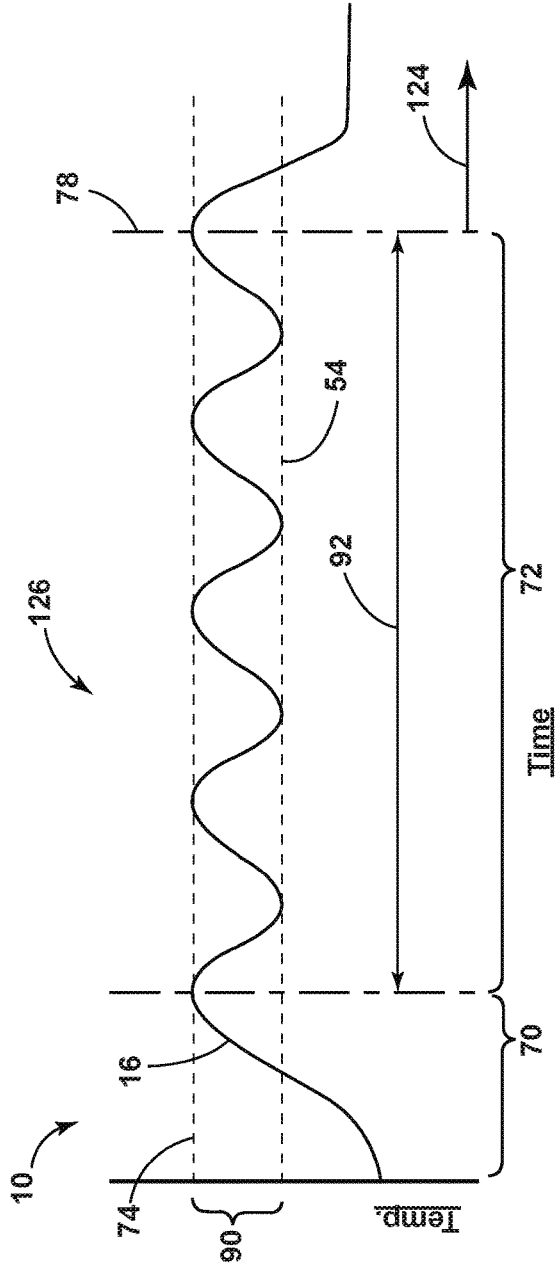

HEATED MECHANISM FOR DEPLOYABLE EXTERIOR DOOR HANDLE FOR A VEHICLE

FIELD OF THE INVENTION

The present invention generally relates to vehicle doors, and more specifically, a deployable vehicle door that incorporates a heating mechanism within the door handle.

BACKGROUND OF THE INVENTION

Various automobile designs include exterior door handles that can deploy for use. These door handles are flush mounted and generally inaccessible when the occupant is within the vehicle or when the vehicle is parked and not in use. When the occupant approaches the vehicle from the exterior, the door handles can deploy, such that the occupant can grasp the deployable handle for operating the vehicle door to enter the passenger cabin of the vehicle.

SUMMARY OF THE INVENTION

According to one aspect of the present invention, a vehicle includes a door-operating mechanism for selectively releasing a vehicle door from a closed position. A door handle is in communication with the door operating mechanism and is disposed on the vehicle door. The door handle is operable between a flush position, wherein an outer face of the door handle is flush with a portion of an exterior surface of the vehicle door immediately surrounding the door handle such that only the outer face of the door handle is accessible, and an extended position, wherein the outer face of the door handle is moved away from the exterior surface of the vehicle door such that a rear surface of the door handle is accessible. A heating mechanism is in thermal communication with the outer face of the door handle and the exterior surface of the vehicle door immediately surrounding the door handle. A remote transmitter is in communication with the heating mechanism, wherein the remote transmitter selectively activates the heating mechanism.

According to another aspect of the present invention, a vehicle door includes a door-operating mechanism and a door handle operable between a flush position, wherein the door handle is inoperable with respect to the door-operating mechanism, and an extended position, wherein the handle is selectively operable with respect to the door-operating mechanism. A heating mechanism is in thermal communication with the outer surface of the door handle.

According to another aspect of the present invention, a vehicle door includes an outer door panel having a handle recess and a door handle operable between a flush position within the handle recess and an extended position partially outside the handle recess. A heating mechanism is proximate the handle recess and operable between deactivated and heating states, wherein the heating mechanism in the heating state maintains a surface temperature proximate the door handle at a predetermined temperature range.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 8 is a schematic diagram illustrating operation of the heating mechanism according to one aspect;

FIG. 9 is a schematic diagram illustrating operation of the heating mechanism according to another aspect;

DETAILED DESCRIPTION OF THE PREFERRED EMBODIMENTS

Figure 1:
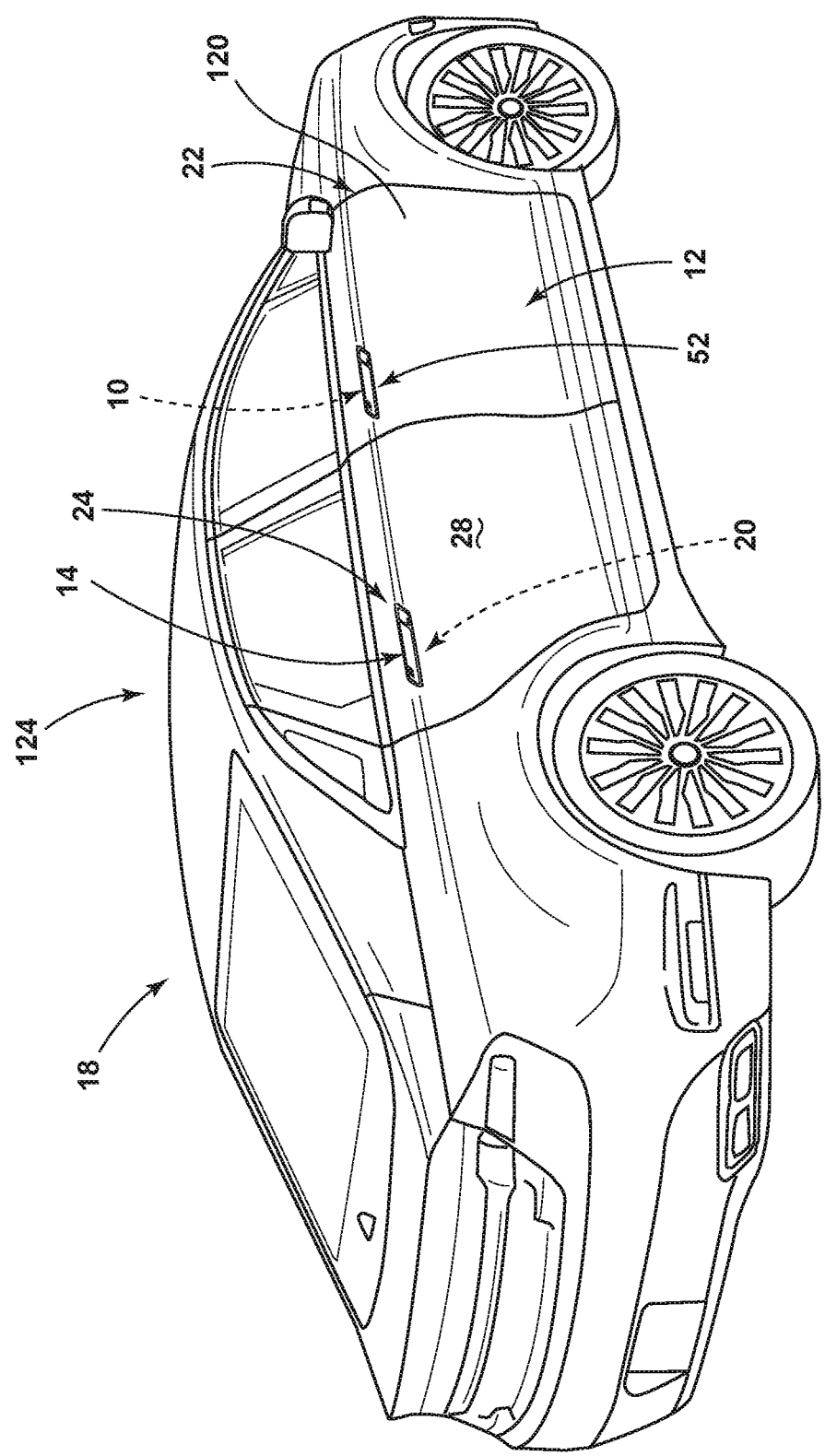
FIG. 1 is a side perspective view of a vehicle incorporating an aspect of the deployable door handles.
Figure 2:
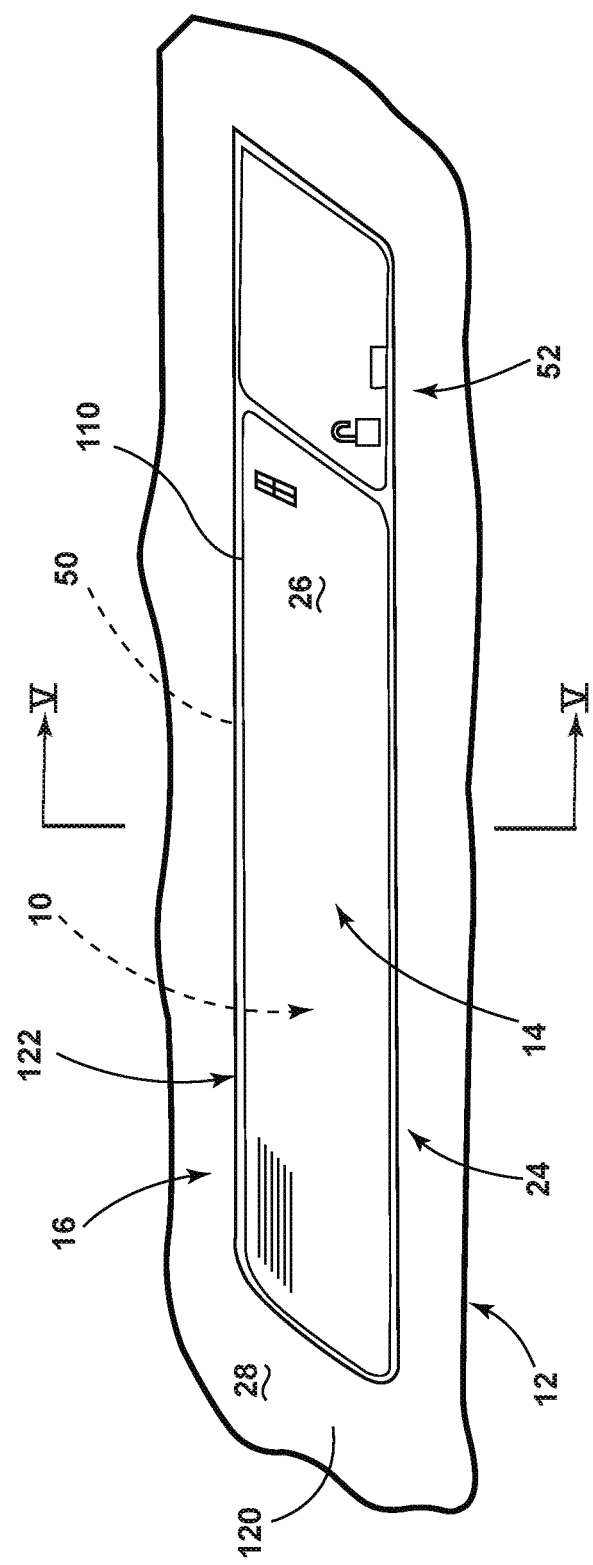
FIG. 2 is a side elevational view of the deployable door handle of FIG. 1, with the deployable door handle in a flush position.
Figure 3:
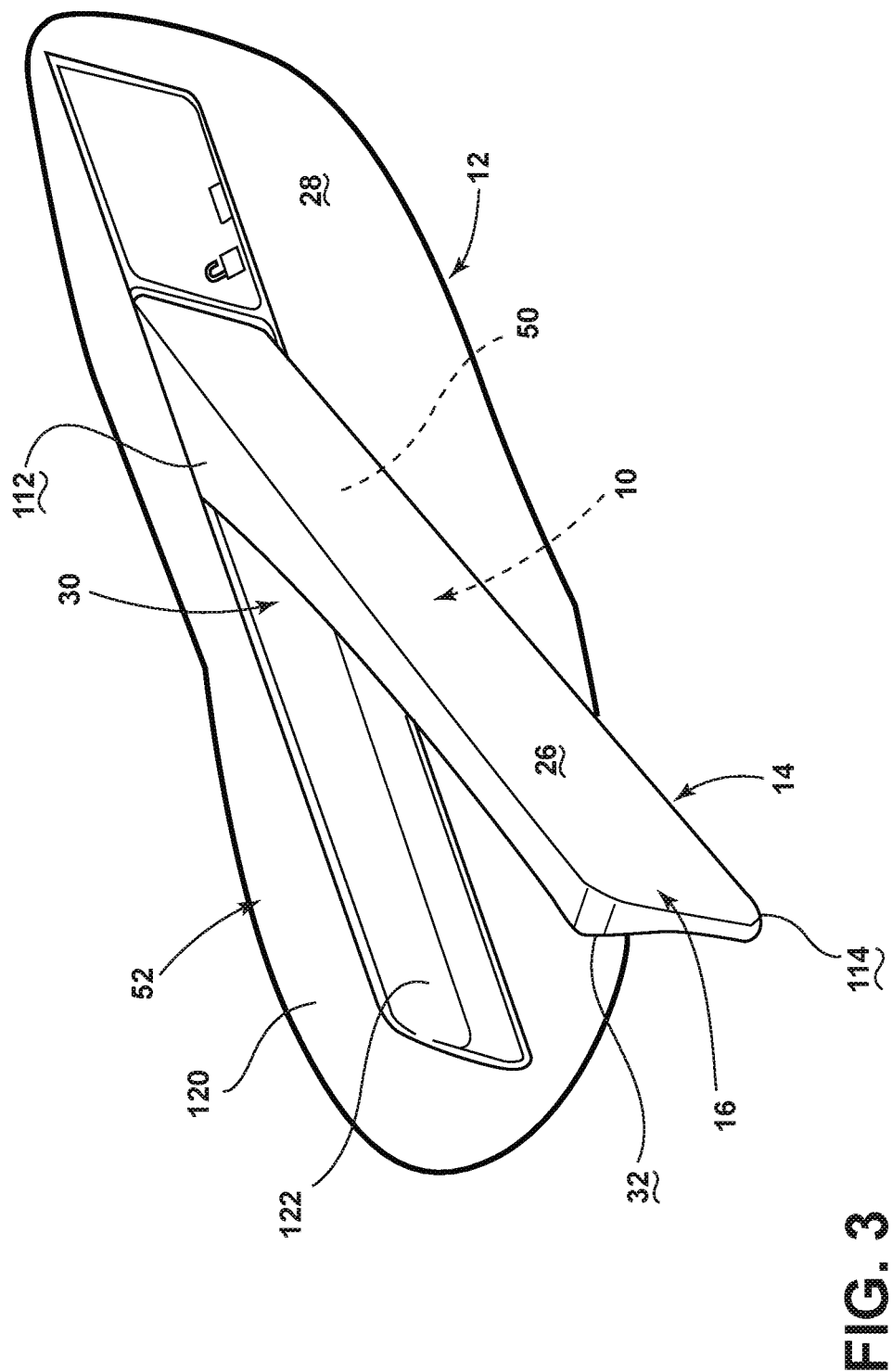
FIG. 3 is a top perspective view of the deployable door handle of FIG. 2 shown in an extended or deployed position.
Figure 4:
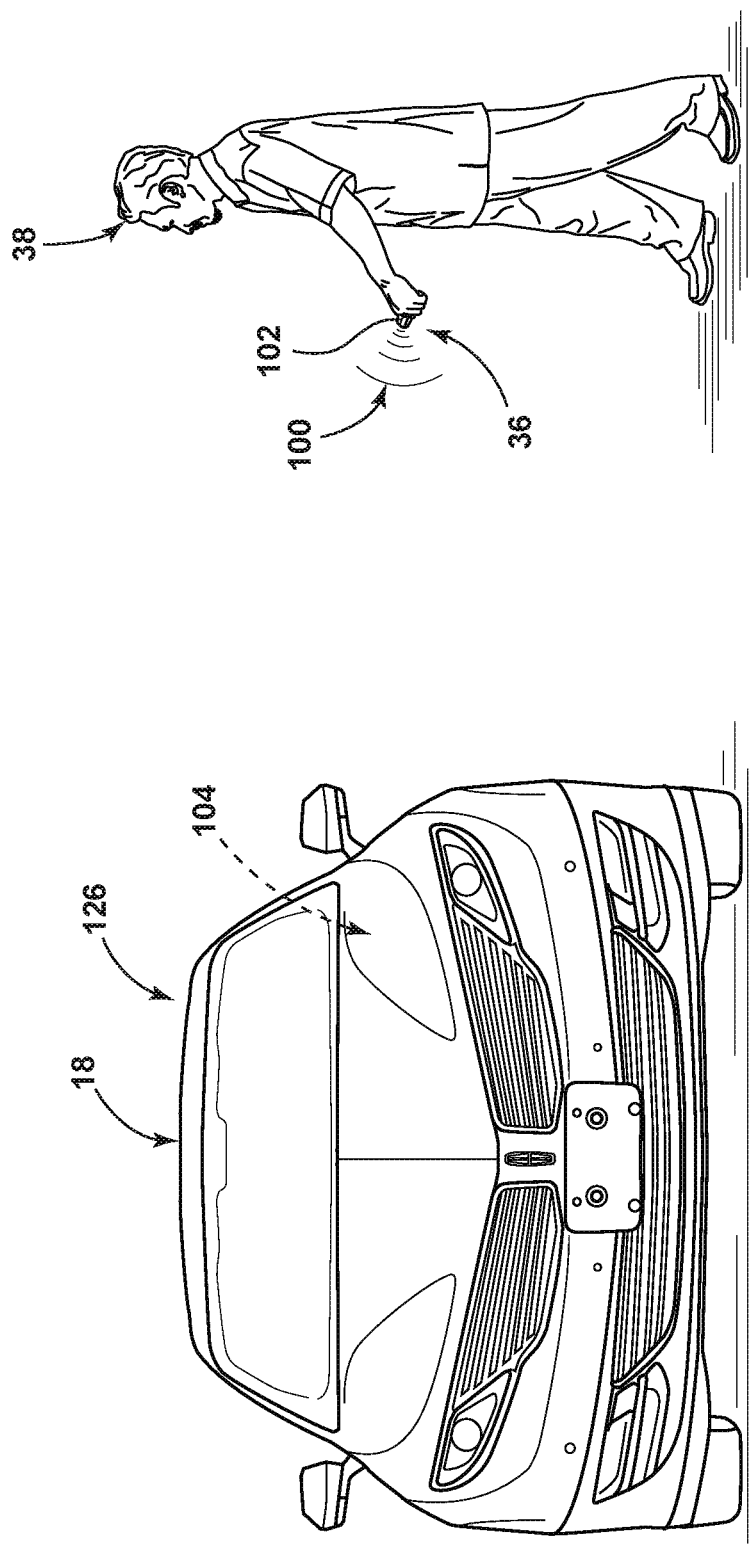
FIG. 4 is a schematic illustration of a user activating heating mechanism of the deployable door handle using a remote start transmitter.
Figure 6:
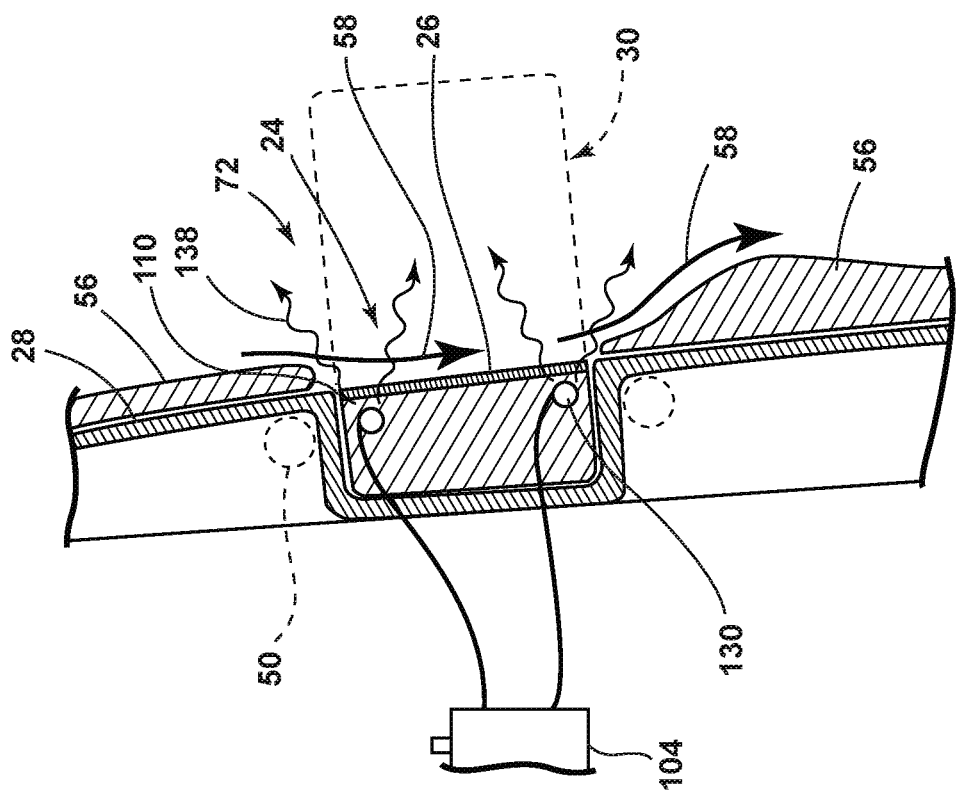
FIG. 6 is a schematic cross-sectional view of the deployable door handle of FIG. 5 and illustrating a maintenance state of the heating mechanism for the deployable door handle.
Figure 5:
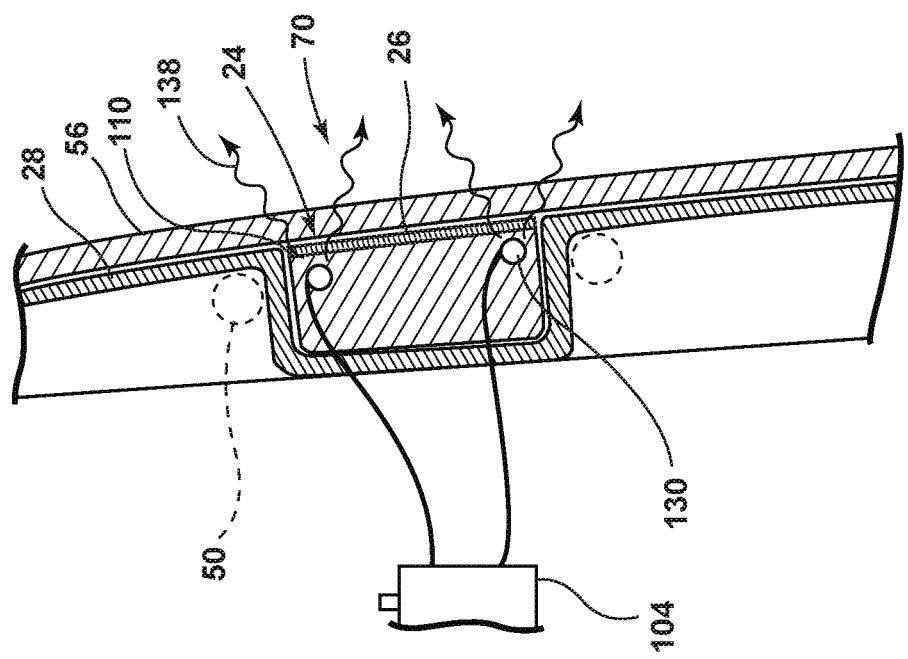
FIG. 5 is a schematic cross-sectional view of the deployable door handle of FIG. 2, taken along line V-V and illustrating an activation state of the heating mechanism of the deployable door handle.
Figure 7:
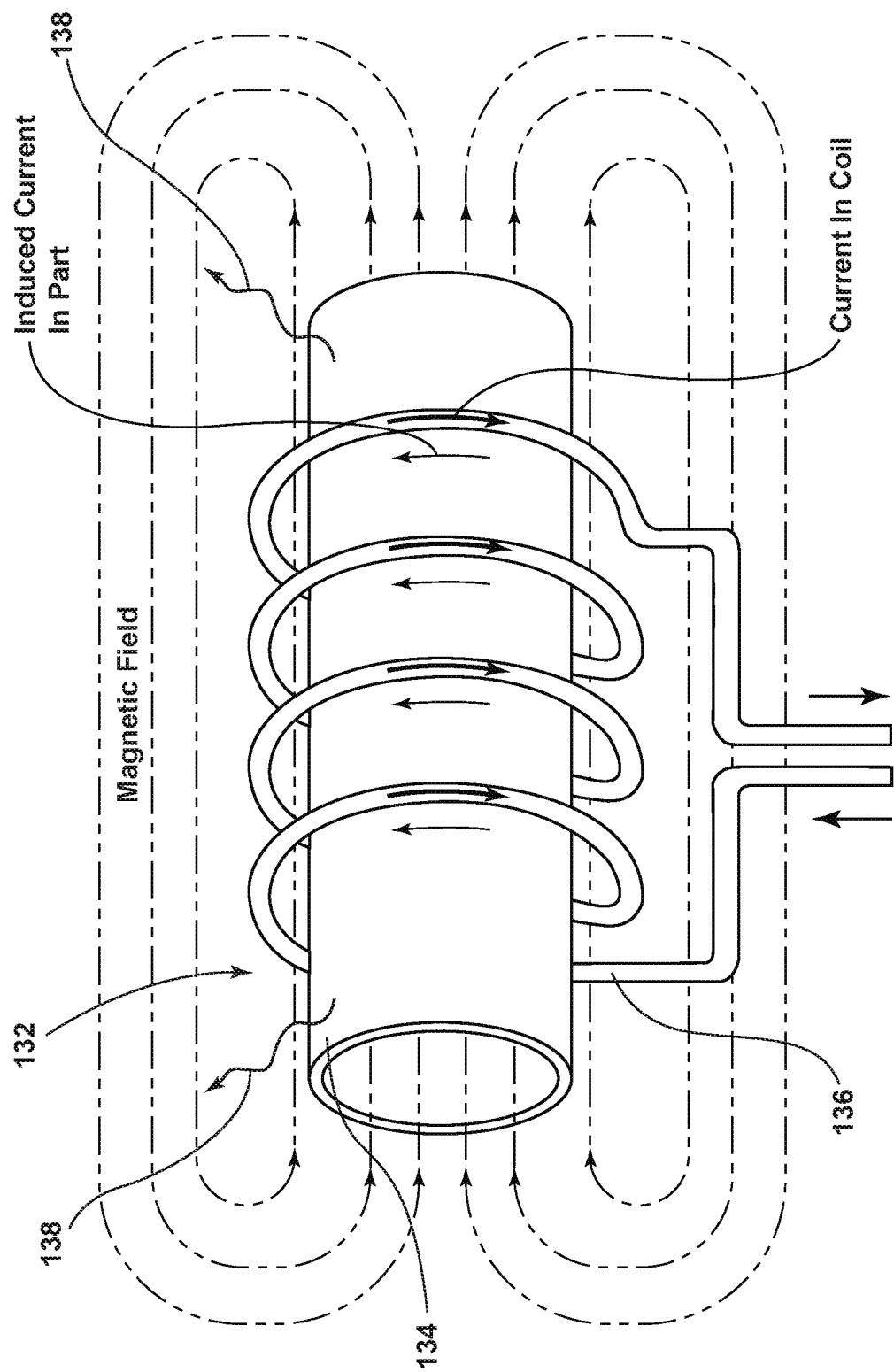
FIG. 7 is a schematic diagram illustrating operation of an inductive heater that can be incorporated within an aspect of the heating mechanism for the deployable door handle.
Figure 10:
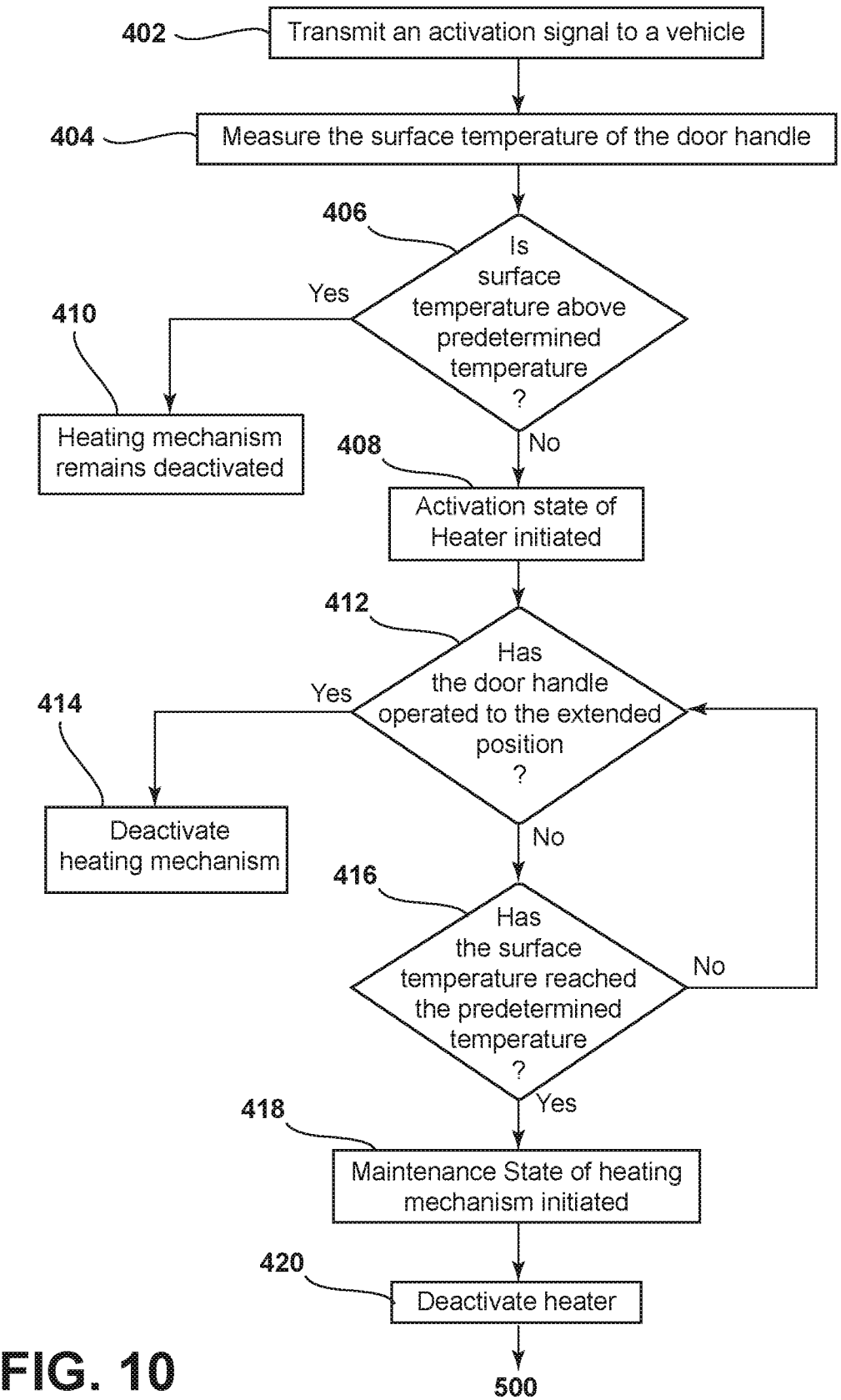
FIG. 10 is a schematic flow diagram illustrating operation of the heating mechanism during an activation state.
Figure 11:
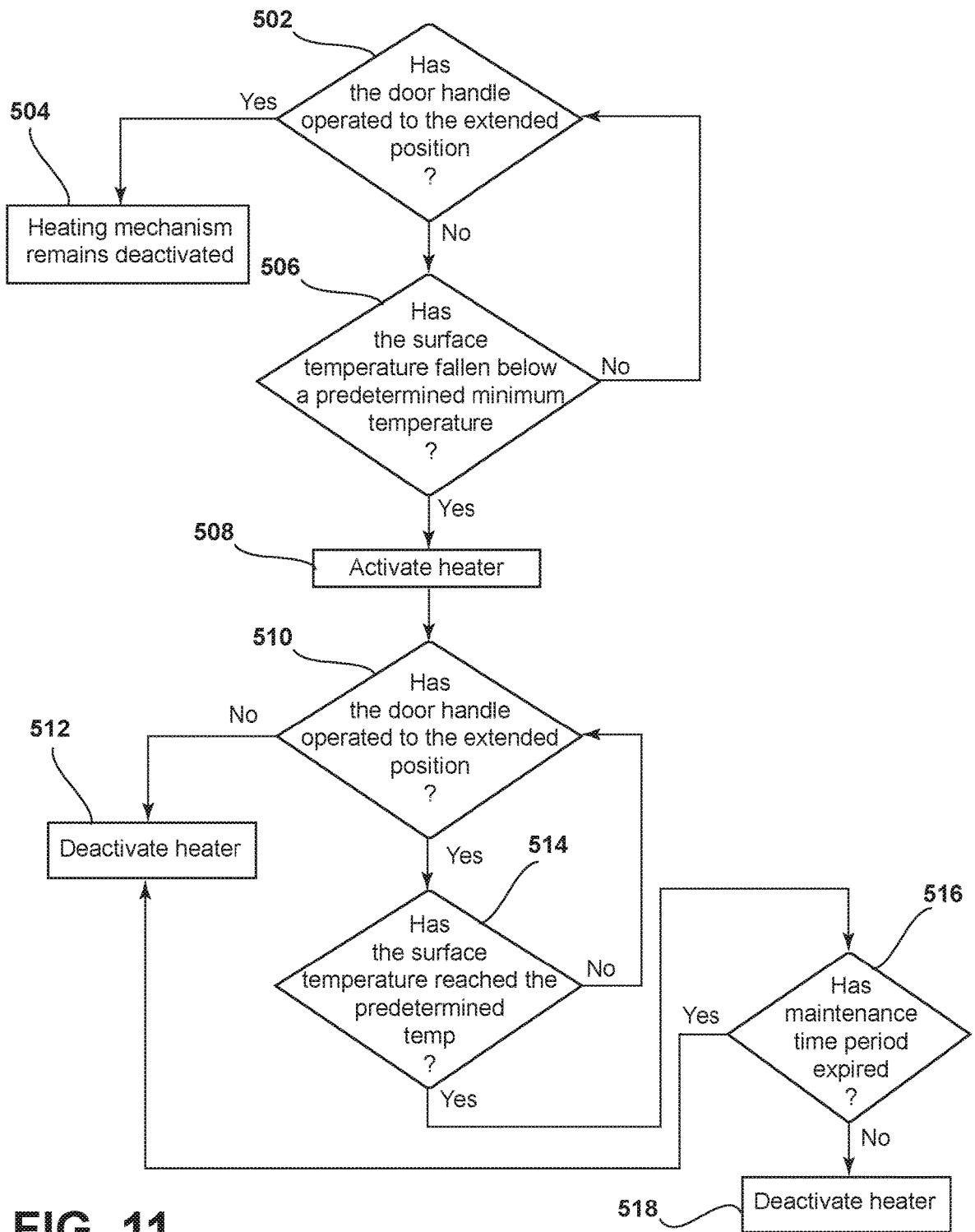
FIG. 11 is a schematic flow diagram illustrating operation of a maintenance state of an aspect of a heating mechanism.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-4, reference numeral 10 generally refers to a heating mechanism for a vehicle door 12 incorporated proximate an exterior deployable door handle 14 and configured to elevate a surface temperature 16 of a portion of the vehicle door 12 proximate the deployable door handle 14. The vehicle 18 includes a door operating mechanism 20 that selectively releases the vehicle door 12 from a closed position 22. A door handle 14, such as a deployable handle, is disposed in communication with the door operating mechanism 20. The door handle 14 is disposed on the vehicle door 12, where the door handle 14 is operable between at least two positions, the first being a flush position 24, wherein an outer face 26 of the door handle 14 is flush with a portion of an exterior surface 28 of the vehicle door 12 immediately surrounding the door handle 14. The flush position 24 is configured such that only the outer face 26 of the door handle 14 is visible and accessible from the outside of the vehicle 18. The second position of the door handle 14 is an extended position 30 or a deployed position, wherein the outer face 26 of the door handle 14 is moved away from the exterior surface 28 of the vehicle door 12. In this manner, the extended position 30 is configured such that a rear surface 32 of the door handle 14 is accessible by a user 38 from the outside of the vehicle 18 so the user 38 can grasp the door handle 14 to operate the door operating mechanism 20. A heating mechanism 10 is disposed in thermal communication with the outer face 26 of the door handle 14 and the exterior surface 28 of the vehicle door 12 immediately surrounding the door handle 14. A remote transmitter 36 is in communication with the heating mechanism 10, wherein the remote transmitter 36 selectively activates the heating mechanism 10.

Referring now to FIGS. 1-6, it is contemplated that a temperature sensor 50 can be placed in communication with a handle region 52 of a vehicle door 12. The handle region 52 can include at least one of the outer face 26 of the door handle 14 and the exterior surface 28 of the vehicle door 12 immediately surrounding the door handle 14, or both. The temperature sensor 50 can be placed in communication with the heating mechanism 10, such that when the temperature sensor 50 senses that a surface temperature 16 within a particular portion of the handle region 52 falls below a predetermined minimum temperature 54, such as the freezing point of water, the heating mechanism 10 can be selectively activated or, in certain situations, automatically activated, to increase the surface temperature 16 of at least a portion of the handle region 52. It is contemplated that during use of a vehicle 18 in colder climates, ice 56 can form on an exterior surface 28 of the vehicle door 12, such that the deployable door handle 14 may be incapable of moving to the extended position 30. Ice 56 forming on the exterior surface 28 of the vehicle door 12 may block the movement of the deployable door handle 14 from the flush position 24 to the extended position 30. The use of the heating mechanism 10 incorporated within a portion of the handle region 52 serves to increase the surface temperature 16 of at least a portion of the handle region 52 to cause the ice 56 or other frozen fluid within the handle region 52 to melt and flow as liquid water 58?, or potentially evaporate in a gaseous state, away from the handle region 52. In this manner, the heating mechanism 10 elevates the surface temperature 16 of the handle region 52 to eliminate ice 56 that may form within the handle region 52 to allow for free movement of the deployable door handle 14 between the flush and extended positions 24, 30. According to various embodiments, it is contemplated that the temperature sensor 50 described herein can be a thermistor, thermocouple, thermometer, combinations thereof, or other similar temperature sensor 50 that can be used to activate and/or deactivate the heating mechanism 10 for the deployable door handle 14.

Referring again to FIGS. 1-9, the operation of the heating mechanism 10 can include an activation state 70 and a subsequent maintenance state 72. In such an embodiment (as exemplified in FIG. 9), activation of the heating mechanism 10 initiates the activation state 70 to operate the heating mechanism 10 until one of the following occurs: a surface temperature 16 of the handle region 52 reaches a predetermined temperature 74, or the door handle 14 is operated from the flush position 24 to the extended position 30.

According to various alternate embodiments, it is contemplated that the activation state 70 can operate until the door handle 14 is operated from the flush position 24 to the extended position 30, or a first predetermined time period 76 expires (as exemplified in FIG. 8). The first predetermined time period 76 may be used in conjunction with the surface temperature 16 reaching the predetermined temperature 74 to effectuate a time out function 78 of the heating mechanisms 10.

Referring again to FIGS. 1-9, the heating mechanism 10 of the deployable door handle 14 can initiate the maintenance state 72 after the surface temperature 16 of the outer face 26 of the door handle 14 reaches a predetermined temperature 74, or, where applicable, at the expiration of the first predetermined time period 76. When the heating mechanism 10 is in the maintenance state 72, the heating mechanism 10 activates intermittently to maintain the surface temperature 16 of the handle region 52 within a predetermined temperature range 90. The predetermined temperature range 90 is configured to maintain the surface temperature 16 at least close to or above the freezing point of water, such that water that may drip into the handle region 52 from melted ice 56 situated above the door handle 14 is not permitted to re-freeze within the handle region 52. Accordingly, the maintenance state 72 of the heating mechanism 10 serves to maintain at least a portion of the handle region 52 in a temperature range that prevents this refreezing of ice 56 within the handle region 52. It is contemplated that the maintenance state 72 continues until one of the following occurs: a predetermined maintenance time period, or a predetermined second time period expires, or the door handle 14 is operated from the flush position 24 to the extended position 30.

Referring again to FIGS. 1-6, it is contemplated that the remote transmitter 36 for activating the heating mechanism 10 is a remote start control, such as that disposed within a key fob for a vehicle 18. Upon activation of the remote start control, a signal 100 is transmitted from the remote starter 102 to the vehicle 18 and the electrical system 104 of the vehicle 18. This signal 100 activates the heating mechanism 10. In particular, the heating mechanism 10 may only be activated when the surface temperature 16 of the handle region 52 is below the predetermined minimum temperature 54, such as below the freezing point of water, or where sensors within the vehicle 18 detect the presence of ice 56 upon the exterior surface 28 of a vehicle door 12. Once activated, the activation state 70 of the heating mechanism 10 is initiated to increase the surface temperature 16 within the handle region 52 of the vehicle door 12. According to the various embodiments, operation of the deployable door handle 14 from the flush position 24 to the extended position 30 deactivates the heating mechanism 10 until it is reactivated under the appropriate temperature conditions and through activation of a remote transmitter 36. It is contemplated that the use of the remote starter 102 activates the heating mechanism 10 within the deployable door handle 14 when the user 38 is at a sufficient range to allow the user 38 to approach the vehicle 18 during operation of the heating mechanism 10. Accordingly, the ice 56 within the handle region 52 may be sufficiently melted to allow for operation of the deployable door handle 14 when the user 38 arrives. In this manner, from the time that the user 38 activates the remote starter 102 to when the user 38 approaches the vehicle 18, the deployable door handle 14 can be clear of ice 56 to be operated from the flush position 24 to the extended position 30.

Where the remote start mechanism has an automatic time out function 78, where the engine turns off after a certain period of time without the user 38 accessing the vehicle 18, the heating mechanism 10 can work in conjunction with this time out function 78 to deactivate the heating mechanism 10 after a certain amount of time that the user 38 has not accessed the deployable door handle 14. It is contemplated that after the automatic start function of the vehicle 18 deactivates the engine of vehicle 18, the maintenance state 72 of the heating mechanism 10 can be initiated or maintained for the maintenance time period after the engine has been deactivated. During this maintenance time period, the maintenance state 72 of the heating mechanism 10 prevents re-icing of the handle region 52 for an additional period of time after the vehicle 18 automatically turns off after not being accessed for a certain period of time. Accordingly, liquid water 58? runs down and away from the door handle 14.

Referring again to FIGS. 1-6, the heating mechanism 10 for the deployable door handle 14 can include a heating element that is disposed distal from the door handle 14. Although distal from the door handle 14, the heating element can be placed in thermal communication with an exterior surface 28 of the outer door panel 120 surrounding the door handle 14. In this manner, the heating element can increase the surface temperature 16 near the seam 110 that exists between the deployable door handle 14 in the flush position 24 and the exterior surface 28 of the vehicle door 12. Accordingly, the heating element melts only those portions of the handle region 52 necessary to allow for operation of the deployable door handle 14 from the flush position 24 to the extended position 30. When a sufficient amount of ice 56 is removed from the handle region 52, the deployable door handle 14 is permitted to move freely between the flush position 24 and the extended position 30. It is contemplated that the deployable door handle 14 can include a motor that is disposed proximate the door handle 14 to operate the door handle 14 between the flush and extended positions 24, 30.

Referring again to FIGS. 1-6, the activation and maintenance states 70, 72 of the heating mechanism 10 can be initiated and deactivated according to one or both of a first and second predetermined time period 76, 92 and/or various temperature readings gathered by the temperature sensor 50 placed in communication with the heating mechanism 10 and the handle region 52. Accordingly, after the heating mechanism 10 has been activated through the signal 100 from the remote starter 102, the activation state 70 can operate for the first predetermined time period 76, or until the outer face 26 of the door handle 14 or another portion of the exterior surface 28 of the vehicle door 12 has a surface temperature 16 substantially equal to that of a predetermined surface temperature 16. At such a time, the heating mechanism 10 can deactivate and the maintenance state 72 can be initiated. The maintenance state 72, after being initiated, is designed to maintain the surface temperature 16 of at least a portion of a handle region 52 within a predetermined temperature range 90 to prevent the re-icing of the handle region 52 that might prevent use of the door handle 14 from being operated between the flush and extended positions 24, 30. It is contemplated that the overall time period for operation of the activation and maintenance states 70, 72 can be a predetermined period of time, such as 10 minutes, 20 minutes, or other similar time period that is set by the manufacturer or set by the user 38 of the vehicle 18. It is contemplated that performance of the maintenance state 72 of the heating mechanism 10 may serve to prevent overheating of the handle region 52 that may damage certain interior and/or exterior portions of a vehicle door 12.

Referring again to FIGS. 1-6, it is contemplated that the vehicle door 12 can include the door operating mechanism 20. The deployable door handle 14 is operable between a flush position 24, wherein the door handle 14 is inoperable with respect to the door operating mechanism 20, and the extended position 30, wherein the handle is selectively operable with respect to the door operating mechanism 20. The door handle 14 can also include the heating mechanism 10 that is placed in thermal communication with the outer face 26 of the door handle 14. According to various embodiments, the deployable door handle 14 being in the flush position 24 may be a sufficient mechanism for preventing operation of the door handle 14. In such an embodiment, the placement of the operable door handle 14 in the flush position 24 does not provide any grip hold for a user 38 to grasp any portion of the operable door handle 14. It is contemplated that the seam 110 between the operable door handle 14 and the portions of the vehicle door 12 surrounding the door handle 14 provides a very minimal clearance for aesthetic purposes and also to substantially prevent debris from entering between the door handle 14 and the vehicle door 12. Alternatively, when the door handle 14 has moved to the extended position 30, the user 38 is able to grasp the outer face 26 of the door handle 14, the top surface 112 and bottom surface 114 of the door handle 14 and the rear surface 32 of the door handle 14. In the extended position 30, the user 38 can manipulate the door handle 14 to operate the door operating mechanism 20 to remove the door from the closed position 22. As discussed above, the heating mechanism 10 is selectively activated through operation of a remote transmitter 36 in communication with the electrical system 104 of the vehicle 18. Typically, such a remote device will be a remote starter 102. However, certain technologies incorporated within the vehicles 18 allow for the incorporation of automatic starters within smart phones, other wearable technology, computer programs, applications, cloud computing technologies, and other similar remote transmitting devices and systems. The use of the remote starter 102 as the remote transmitter 36 is particularly useful. The range of operation of a remote starter 102 provides a sufficient time period within which the heating mechanism 10 can effectively operate while the user 38 approaches the vehicle 18 after activating the remote starter 102. Additionally, the purpose of the remote starter 102 to prepare the vehicle 18 for operation by the user 38 has a convenient synergy with the heating mechanism 10, which prepares the door handle 14 for deploying to the extended position 30.

Referring again to FIGS. 1-6, the vehicle door 12 can include an outer door panel 120 having a handle recess 122 and a door handle 14 operable between a flush position 24 within the handle recess 122 and an extended position 30 at least partially outside of the handle recess 122. The heating mechanism 10 can be disposed proximate the handle recess 122 and operable to define deactivated and heating states 124, 126 of the heating mechanism 10. In such an embodiment, the heating mechanism 10 in the heating state 126 is configured to maintain a surface temperature 16 proximate the door handle 14 at the predetermined temperature range 90. In such an embodiment, the heating state 126 of the heating mechanism 10 can include the activation state 70 and the maintenance state 72, as described above.

Referring now to FIGS. 1-7, it is contemplated that the heating mechanism 10 can include a resistive heating element 130, such as a wire heating element, or can include an inductive heating mechanism 132 that includes a ferromagnetic member 134 disposed within or proximate the deployable door handle 14 and in thermal communication with the outer face 26 of the door handle 14. The inductive heating element can also include an electrical component 136, such as a wire through which electricity flows. This electrical component 136 can be positioned distal from, but in electromagnetic communication with, the ferromagnetic member 134. According to such an embodiment, activation of the electrical component 136 through the flow of electrical current through the electrical component 136, can inductively generate heat 138 that increases the surface temperature 16 of the outer face 26 of the door handle 14. Other heating mechanisms 10 can include fluid heating, where warm fluid is made to flow proximate the deployable door handle 14, the use of heated air from the engine compartment for warming the exterior surface 28 of the handle region 52 and the outer face 26 of the door handle 14, combinations of the above-described heating mechanisms 10, and other similar heating mechanisms 10 for warming portions of the handle region 52 of the vehicle door 12.

Referring now to FIGS. 1-10, having described the various aspects of the heating mechanism 10 for a deployable door handle 14, a method 400 is disclosed for operating the heating mechanism 10 for a deployable door handle 14. According to method 400, an activation signal 100 is transmitted to a vehicle 18 for initiating operation of the heating mechanism 10 (step 402). According to various aspects of the device, the temperature sensor 50 can measure the surface temperature 16 of the door handle 14, or an area of the vehicle door 12 proximate the door handle 14 (step 404). This measurement of the temperature sensor 50 is used to determine whether the surface temperature 16 of the handle region 52, or a portion of the handle region 52, is above a predetermined temperature 74 (step 406). If the surface temperature 16 is above the predetermined temperature 74, no ice 56 may be formed and the heating mechanism 10 remains deactivated (step 410). If the surface temperature 16 is not above the predetermined temperature 74, ice 56 may be formed on the outer surface of the vehicle 18. According to various aspects of the device, a surface temperature 16 below the predetermined temperature 74 may cause an initiation of the activation state 70 of the heating mechanism 10. In various alternate aspects, various humidity sensors and/or ice sensors may be implemented to ascertain whether ice 56 has formed on the exterior surface 28 of the vehicle door 12 that would necessitate initiation of the activation state 70 of the heating mechanism 10 (step 408). In certain conditions, freezing rain can result in an accumulation of ice 56 on a vehicle 18 when the air temperature is above the freezing point of water. In such an instance, other sensors may be implemented to detect the presence of ice 56.

Referring again to FIGS. 1-10, once the activation state 70 has been initiated, the activation state 70 may remain active to heat the heating mechanism 10 until the door handle 14 has been operated from the flush position 24 to the extended position 30 (step 412). As discussed above, when the door handle 14 is moved to the extended position 30, such movement of the door handle 14 can serve to deactivate the heating mechanism 10 (step 414). Where the handle has not moved to the extended position 30, another temperature reading can be gathered to determine when the surface temperature 16 has reached the predetermined temperature 74 (step 416). This step 416 can be used to make sure that the surface temperature 16 within portions of the handle region 52 is warm enough to melt any ice 56 that may have formed within this handle region 52. As discussed above, once the surface temperature 16 within at least a portion of the handle region 52 has reached the predetermined temperature 74, the maintenance state 72 of the heating mechanism 10 can be initiated (step 418). Upon initiation of the maintenance state 72, the heating mechanism 10 can be deactivated (step 420).

Referring now to FIGS. 1-11, FIG. 11 exemplifies an additional flow chart of the maintenance state 72 of the heating mechanism 10 that serves as a continuation of the method 400 for operating the heating mechanism 10. According to method 500 for operating the maintenance state 72, the heating mechanism 10 may operate until the door handle 14 is operated to the extended position 30 (step 502). Once the door handle 14 has moved to the extended position 30, the heating mechanism 10 remains deactivated, where the heating mechanism 10 is deactivated during the initiation of the maintenance state 72 (step 504). Where the door handle 14 has not been moved to the extended position 30, the temperature sensor 50 can determine whether the surface temperature 16 within at least a portion of the handle region 52 has fallen below a predetermined minimum temperature 54 (step 506). Once the surface temperature 16 has fallen below this predetermined minimum temperature 54, the heating mechanism 10 is again activated (step 508). After activation of the heating mechanism 10 in step 508, the heating mechanism 10 may remain active until the door handle 14 is operated to the extended position 30 (step 510), at which time the heating mechanism 10 will be deactivated (step 512). Where the door handle 14 remains in the flush position 24 and is not moved to the extended position 30, the temperature sensor 50 again reads whether the surface temperature 16 within at least a portion of the handle region 52 has reached the predetermined temperature 74 (step 514). The series of measurements to determine whether the surface temperature 16 has fallen below the predetermined minimum temperature 54 or reached the predetermined temperature 74 are used to make sure that the surface temperature 16 of the handle region 52 during the maintenance state 72 remains within a predetermined temperature range 90 to prevent the re-icing of at least a portion of the handle region 52. If the surface temperature 16 has reached the predetermined temperature 74, the heating mechanism 10 monitors how long the maintenance state 72 has been running. The maintenance state 72 is configured to run, according to various aspects, for a predetermined maintenance time period (step 516). If this maintenance time period has not been reached and the surface temperature 16 has reached the predetermined temperature 74, the heating mechanism 10 is deactivated (step 518) but the cycle begins again and the heating mechanism 10 reactivates if the door handle 14 has not been operated to the extended position 30 (step 502) and the surface temperature 16 has fallen below the predetermined minimum temperature 54 (step 506). If the maintenance time period has expired, the heating mechanism 10 is then deactivated (step 512) and the system is shut down as part of a "time out" aspect of the heating mechanism 10.

According to the various embodiments, it is contemplated that the heating mechanism 10 described herein can be implemented in deployable door handles 14, but can also be deployed within conventional door handles 14 where icing may prevent the operation of the door handles 14. It is contemplated that the heating mechanism 10 described herein can be incorporated within driver and passenger side door handles, trunk door handles, and other similar door handle-type features incorporated within a vehicle 18.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle door comprising:
   a door-operating mechanism;
   a door handle operable between a flush position, wherein the door handle is inoperable with respect to the door-operating mechanism, and an extended position, wherein the door handle is selectively operable with respect to the door-operating mechanism;
   a heating mechanism in thermal communication with an outer face of the door handle;
   a ferromagnetic member disposed in thermal communication with the outer face of the door handle; and
   an electrical component positioned distal from and in electromagnetic communication with the ferromagnetic member and outside the door handle, wherein activation of the electrical component generates inductive heating that increases a surface temperature of the outer face of the door handle.

2. The vehicle door of claim 1, wherein the heating mechanism is selectively activated through operation of a remote device in communication with an electrical system of a vehicle.

3. The vehicle door of claim 1, wherein the heating mechanism includes an activation state and a subsequent maintenance state, wherein activation of the heating mechanism initiates the activation state to operate the heating mechanism until one of (1) expiration of a first predetermined time period and (2) operation of the door handle from the flush position to the extended position.

4. The vehicle door of claim 3, wherein the heating mechanism initiates the maintenance state after expiration of the first predetermined time period, wherein the heating mechanism in the maintenance state activates intermittently, wherein operation of the maintenance state continues until one of (1) expiration of a second predetermined time period and (2) operation of the door handle from the flush position to the extended position.

5. The vehicle door of claim 1, wherein the heating mechanism is further disposed distal from the door handle and in thermal communication with an exterior surface of an outer door panel surrounding the door handle.

6. The vehicle door of claim 4, wherein a temperature sensor is placed in communication with the outer face of the door handle, and wherein the intermittent operation of the heating mechanism during the maintenance state maintains the outer face of the door handle within a predetermined temperature range.

7. A vehicle door comprising:
   an outer door panel having a handle recess;
   a door handle operable between a flush position within the handle recess and an extended position partially outside the handle recess;
   a heating mechanism proximate the handle recess and operable between deactivated and heating states, wherein the heating mechanism in the heating state maintains a surface temperature proximate the door handle at a predetermined temperature range;
   a ferromagnetic member disposed in thermal communication with an outer face of the door handle; and
   an electrical component positioned in electromagnetic communication with the ferromagnetic member, the electrical component positioned proximate the handle recess and distal from the ferromagnetic member and the door handle, wherein activation of the electrical component generates inductive heating within the ferromagnetic member that increases the surface temperature of at least an outer face of the door handle.

8. The vehicle door of claim 7, wherein the heating state of the heating mechanism includes an activation state, wherein activation of the heating mechanism initiates the activation state to operate the heating mechanism until one of (1) the surface temperature proximate the door handle reaches the predetermined temperature range and (2) operation of the door handle from the flush position to the extended position.

9. The vehicle door of claim 8, wherein the heating state of the heating mechanism includes a maintenance state that initiates only after the surface temperature proximate the door handle reaches the predetermined temperature range, wherein the heating mechanism in the maintenance state activates intermittently, wherein operation of the maintenance state continues until one of (1) expiration of a predetermined maintenance time period and (2) operation of the door handle from the flush position to the extended position.

* * * * *